United States Patent
Wright et al.

(10) Patent No.: US 7,313,774 B2
(45) Date of Patent: Dec. 25, 2007

(54) METHOD AND APPARATUS FOR ASSOCIATING AN ERROR IN A LAYOUT WITH A CELL

(75) Inventors: Peter J. Wright, Sunnyvale, CA (US); Minghui Fan, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 248 days.

(21) Appl. No.: 11/159,285

(22) Filed: Jun. 21, 2005

(65) Prior Publication Data

US 2006/0288318 A1    Dec. 21, 2006

(51) Int. Cl.
*G06F 17/50* (2006.01)
*G06F 9/45* (2006.01)

(52) U.S. Cl. .................. 716/5; 716/11; 716/19
(58) Field of Classification Search .............. 716/1, 716/5, 8, 9, 11, 19
See application file for complete search history.

(56) References Cited

U.S. PATENT DOCUMENTS

| | | | |
|---|---|---|---|
| 6,374,395 B1 * | 4/2002 | Wang | 716/11 |
| 6,571,374 B1 * | 5/2003 | Runyon et al. | 716/5 |
| 2003/0121019 A1 * | 6/2003 | Brown et al. | 716/12 |
| 2006/0053400 A1 * | 3/2006 | Meyer et al. | 716/11 |
| 2006/0090146 A1 * | 4/2006 | LeBritton et al. | 716/4 |
| 2006/0236271 A1 * | 10/2006 | Zach | 716/1 |

* cited by examiner

Primary Examiner—Thuan V. Do
Assistant Examiner—Magid Y. Dimyan
(74) Attorney, Agent, or Firm—Park, Vaughan & Fleming LLP

(57) ABSTRACT

One embodiment of the present invention provides a system that associates an error in a layout with a cell. During operation, the system receives a layout which is designed to create a target feature with an intended shape. Next, the system determines an error in a critical dimension of the target feature. The system then identifies a cell in the layout based on the error's location in the layout, thereby associating the error with the cell. Note that associating errors with cells allows the errors to be summarized based on the associated cells, which can reduce the amount of time required to identify and fix the errors.

20 Claims, 5 Drawing Sheets

METHOD AND APPARATUS FOR ASSOCIATING AN ERROR IN A LAYOUT WITH A CELL

BACKGROUND

1. Field of the Invention

The present invention relates to semiconductor design and manufacturing. More specifically, the present invention relates to a method and an apparatus for associating an error in a layout with a cell.

2. Related Art

As feature sizes on semiconductor chips continue to decrease at a dramatic rate, it is becoming progressively harder to deal with undesirable side effects that occur during various semiconductor manufacturing processes. To remedy this problem, designers often use a number of resolution enhancement techniques (RETs) to improve process performance.

Resolution enhancement techniques, such as optical proximity correction (OPC), typically transform the photomask by adding new sub-resolution patterns and/or by performing complex geometric manipulations to existing patterns. Unfortunately, even after applying such complex RETs, a photomask may still not be able to fully compensate for the undesirable side effects of semiconductor manufacturing processes. Hence, identifying and fixing errors in the layout by checking the design intent against its simulated silicon image is critically important.

Due to the relentless miniaturization of feature sizes, designers are being forced to use complex RETs on an ever increasing number of patterns. Unfortunately, present lithography verification techniques were not designed for such pervasive uses of complex RETs. Specifically, present verification techniques tend to report a large number of layout errors which are usually not summarized properly, which forces designers to spend a large amount of time identifying and fixing layout errors. This can increase time to market, which can result in millions of dollars in lost revenue.

Hence, what is needed is a method and an apparatus to help designers to quickly identify and fix errors in a layout.

SUMMARY

One embodiment of the present invention provides a system that associates an error in a layout with a cell. During operation, the system receives a layout which is designed to create a target feature with an intended shape. Next, the system determines an error in a critical dimension of the target feature. The system then identifies a cell in the layout based on the error's location in the layout, thereby associating the error with the cell. Note that associating errors with cells allows the errors to be summarized based on the associated cells, which can reduce the amount of time required to identify and fix the errors.

In a variation on this embodiment, the system determines an error location within the cell based on the error's location in the layout.

In a variation on this embodiment, prior to receiving the layout, the system receives an uncorrected layout. Next, the system applies an optical proximity correction (OPC) to the uncorrected layout to create the layout.

In a variation on this embodiment, the system receives a layout radius which specifies a region in the layout in proximity of the error's location. Next, the system identifies patterns in the layout within the layout radius. The system then determines a cell in the layout which contains the identified patterns.

In a variation on this embodiment, the system receives an error radius which specifies a range of error values, wherein errors that have error values within the error radius are treated as instances of the same error.

In a variation on this embodiment, the system determines an error in a critical dimension by: generating a simulated shape based on the layout, wherein the simulated shape approximates the actual shape of the target feature by simulating effects of one or more semiconductor manufacturing processes; and determining an error in a critical dimension of the target feature based on a difference between the simulated shape and the intended shape of the target feature.

In a further variation on this embodiment, the layout contains check-figures which identify critical dimensions of features which are likely to have errors. Note that generating simulated shapes only for those features that have an associated check-figure can substantially reduce the total amount of computational time spent on generating simulated shapes.

In a variation on this embodiment, determining the error involves: determining an error location; computing an error value; determining an error type; and identifying layers in the layout that could have caused the error.

In a variation on this embodiment, a semiconductor manufacturing process can include photolithography, etch, or chemical-mechanical polishing (CMP).

DETAILED DESCRIPTION

Integrated Circuit Design and Fabrication

Figure 1:
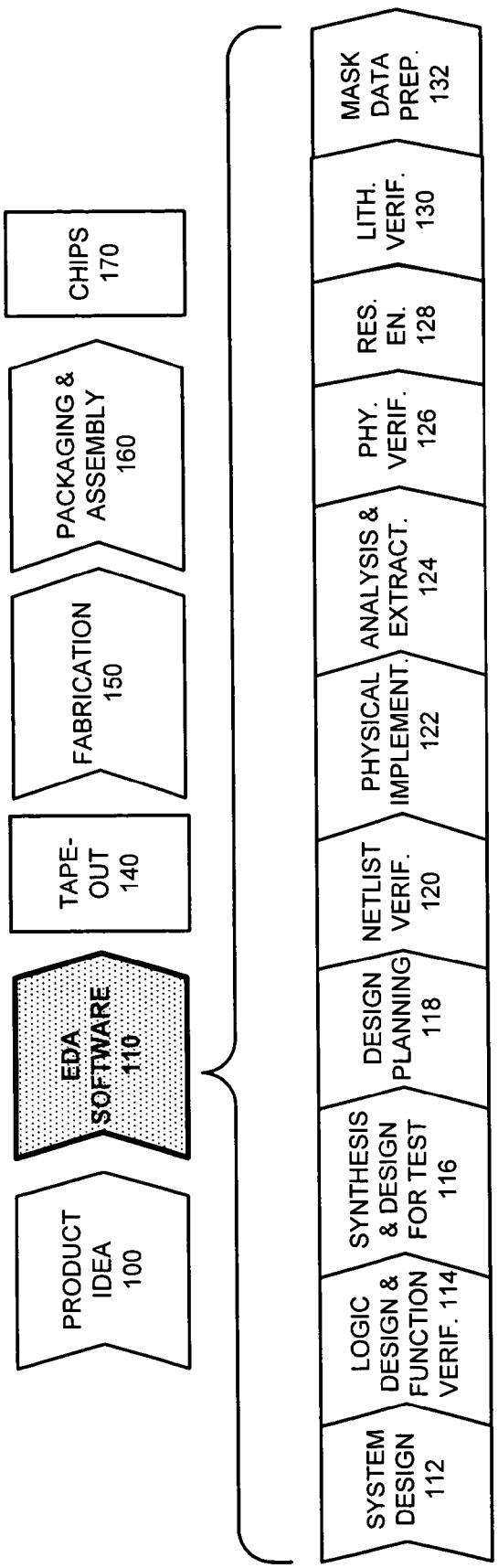
FIG. 1 illustrates various stages in the design and fabrication of an integrated circuit in accordance with an embodiment of the present invention.

FIG. 1 illustrates various stages in the design and fabrication of an integrated circuit in accordance with an embodiment of the present invention.

The process typically begins with a product idea (step 100). Next, the product idea is realized using an integrated circuit, which is designed using Electronic Design Automation (EDA) software (step 110). Once the circuit design is finalized, it is taped-out (step 140). After tape-out, the process goes through fabrication (step 150), packaging, and assembly (step 160). The process eventually culminates with the production of chips (step 170).

The EDA software design step 110, in turn, includes a number of sub-steps, namely, system design (step 112), logic design and function verification (step 114), synthesis and design for test (step 116), design planning (step 118), netlist verification (step 120), physical implementation (step 122), analysis and extraction (step 124), physical verification (step 126), resolution enhancement (step 128), lithography verification (step 130), and mask data preparation (step 132).

Note that EDA software is not limited to designing integrated circuits. Specifically, EDA software can be used to design any object that can be manufactured using semiconductor manufacturing processes. For example, EDA software can be used for designing Micro-Electro-Mechanical Systems (MEMS) or in nanotechnology applications.

Embodiments of the present invention can be used during one or more of the above described stages. Specifically, the SiVL® product from Synopsys, Inc. can be suitably modified to use an embodiment of the present invention to provide a summary of layout errors based on associated cells.

Optical Proximity Correction (OPC)

As feature sizes on semiconductor chips continue to decrease at a dramatic rate, it is becoming progressively harder to deal with undesirable side effects that occur during various semiconductor manufacturing processes. Specifically, optical side effects that occur during lithography can cause unwanted distortions in the printed layout.

To remedy this problem, modern semiconductor manufacturing processes often use a number of resolution enhancement techniques (RETs) to improve image quality. Examples of RETs include modified illumination schemes such as annular and quadruple illumination; photomask techniques such as optical proximity correction (OPC), attenuated and alternating phase-shift masks; as well as other schemes such as pupil filtering, multiple exposure, antireflective layer, and top surface imaging.

An OPC process typically manipulates patterns in the layout to compensate for undesirable side effects. (Although the term "optical proximity correction" is used in this specification, more generally the term as used herein refers to correction for any specified proximity effects, e.g. optical, micro-loading, etch, resist, etc.) These manipulations are usually based upon results of model-based simulations of the layout.

Figure 2:
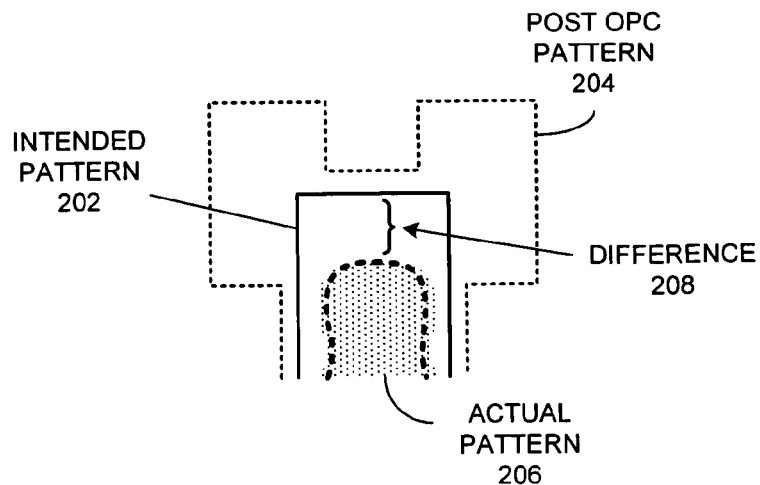
FIG. 2 illustrates how an optical proximity correction process can manipulate patterns in a layout in accordance with an embodiment of the present invention.

FIG. 2 illustrates how an optical proximity correction process can manipulate patterns in a layout in accordance with an embodiment of the present invention.

Intended pattern 202 depicts the pattern that is required to be printed on the wafer's surface. An OPC process then manipulates intended pattern 202 to generate post-OPC pattern 204. Finally, actual pattern 206 depicts the pattern that actually prints on the wafer's surface. Actual pattern 206 is different from intended pattern 202 because the OPC process is typically unable to completely compensate the undesirable optical effects. Note that lithography verification techniques typically generate a simulated pattern (not shown) that approximates the actual pattern 206.

If the difference 208 between intended pattern 202 and actual pattern 206 is too large, it can lead to serious performance problems in the resulting integrated circuit. Note that, if OPC is not used, the difference 208 between intended pattern 202 and actual pattern 206 would most probably be larger.

Lithography Verification

Resolution enhancement techniques, such as OPC, often transform the photomask by adding new sub-resolution patterns and/or by performing geometric manipulations to existing patterns. Consequently, the post-RET photomask often bears little resemblance to the actual silicon result. Hence, checking the intended pattern against a simulated pattern is critically important; because otherwise, the resulting integrated circuit may not work as intended which can end up costing millions of dollars in lost revenue.

Figure 3:
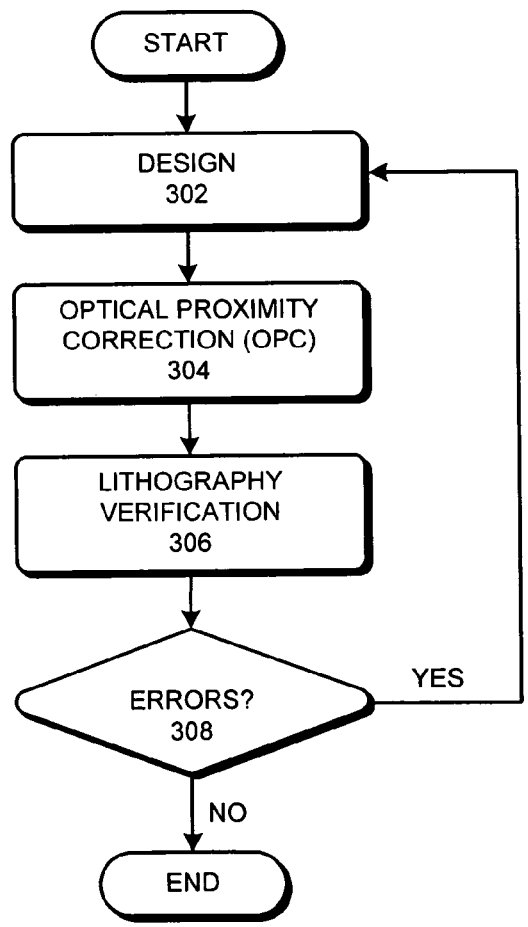
FIG. 3 presents a flowchart that illustrates a process of verifying a design against a simulated silicon image in accordance with an embodiment of the present invention.

FIG. 3 presents a flowchart that illustrates a process of verifying a design against a simulated silicon image in accordance with an embodiment of the present invention.

The process begins at the layout design stage (step 302). This stage defines the intended patterns on the wafer which when manufactured result in the desired semiconductor apparatus.

Next, OPC is performed on the layout to compensate for the undesired optical side effects (step 304).

The system then uses simulation to verify the post-OPC patterns against the design intent, and reports errors to the user (step 306).

Next, the user checks the reported errors (step 308). If errors were reported, the user goes back to the design step to correct these errors. Otherwise, if the simulated silicon patterns match the design intent, the layout is taped out and sent for fabrication.

Due to the increasing complexity and pervasiveness of OPC, the number of layout errors has increased dramatically in recent years. As a result designers are spending an increasing amount of time fixing layout errors which can end up costing millions of dollars.

One embodiment of the present invention can substantially reduce the amount of time required to fix errors in the layout by categorizing errors based on cells. Note that fixing a single error in a cell can cause a number of errors to be fixed because typically a cell is instantiated at a number of locations in the layout, and hence, fixing the error at the cell level can fix other errors in the layout associated with the cell. Furthermore, associating an error with a cell can help a user to identify the root cause for the error, which can also substantially reduce the amount of time required to fix errors.

Process for Associating an Error in a Layout with a Cell

Figure 4:
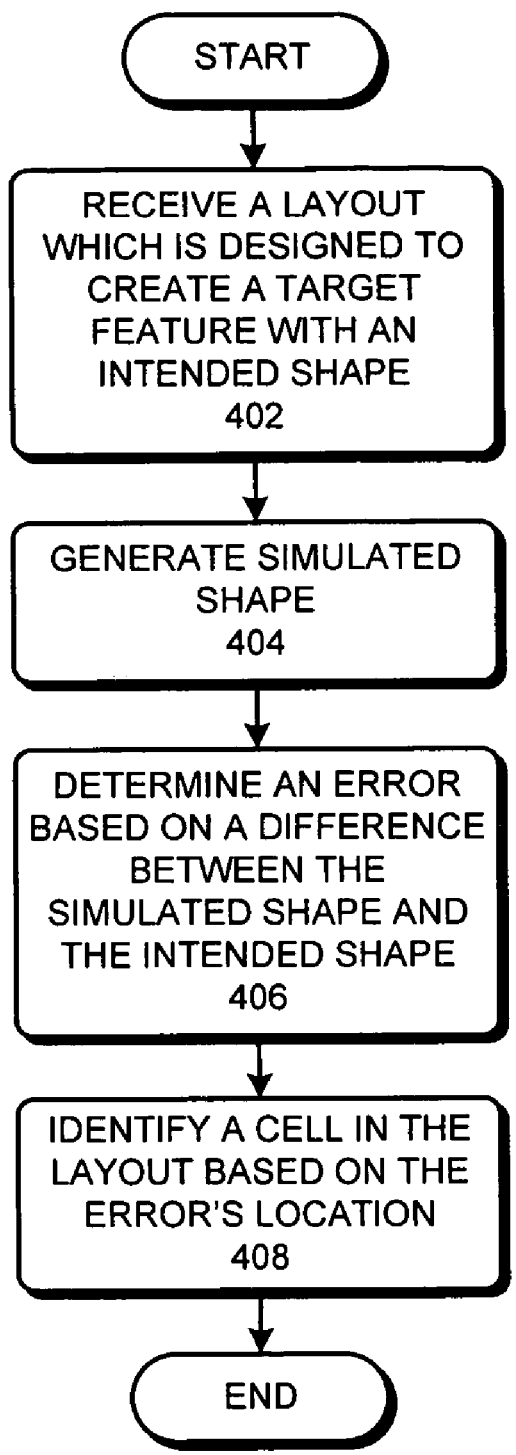
FIG. 4 presents a flowchart that illustrates a process for associating an error in a layout with a cell in accordance with an embodiment of the present invention.

FIG. 4 presents a flowchart that illustrates a process for associating an error in a layout with a cell in accordance with an embodiment of the present invention.

The process typically begins by receiving a layout which is designed to create a target feature with an intended shape (step 402).

Note that the received layout can be either a corrected layout or an uncorrected layout. In one embodiment, the system receives an uncorrected layout, and then applies an optical proximity correction (OPC) to the uncorrected layout to create a corrected layout.

The system then generates a simulated shape based on the layout, wherein the simulated shape approximates the actual shape of the target feature by simulating effects of one or more semiconductor manufacturing processes (step 404).

Semiconductor manufacturing processes can include photolithography, etch, or chemical-mechanical polishing (CMP). Note that the present invention is not limited to specific process models. In general, the present invention can be used in conjunction with any process model that can be used to simulate side effects of one or more semiconductor manufacturing processes.

Note that simulating the effects of semiconductor manufacturing processes can require a large amount of computational resources. To reduce the amount of computation required to identify errors, the system can add check-figures to the layout which identify shapes in the layout that are likely to cause errors. In particular, a check-figure can specifically identify a critical dimension of the target feature which is likely to have an error. Next, the system generates a simulated shape for only those features that have a check-figure. The system then compares the simulated shape with the intended shape of the target feature to conclusively determine whether a critical dimension of the target feature has an error. Using check-figures can help the system to substantially reduce the computational time required for identifying errors in the layout. This is because using check-figures allows the system to identify potential error locations without generating a simulated shape for each feature in the layout.

Next, the system determines an error in a critical dimension of the target feature based on a difference between the simulated shape and the intended shape (step 406).

In one embodiment, the system determines the error by computing a difference between an area of the simulated shape and the intended shape.

Note that determining an error can involve determining an error location, computing an error value, determining an error type, and identifying layers in the layout that could have caused the error.

An integrated circuit typically includes multiple layers, each of which can be of a different type. For example, an integrated circuit often contains polysilicon layers, metal layers, diffusion layers, active layers, etc. Furthermore, patterns on one layer can cause errors in another layer. For example, topographical variations in a polysilicon layer can cause errors in the metal layer that is constructed on top of the polysilicon layer.

One embodiment of the present invention uses information of such layer interactions to identify patterns that could have caused an error. Note that using information of such layer interactions can be very advantageous because it can help to identify the root cause of an error.

The system then identifies a cell in the layout based on the error's location in the layout, thereby associating the error with the cell (step 408).

In one embodiment, the system determines a location within the cell based on the error's location in the layout. Note that associating errors with cells allows the errors to be summarized based on the associated cells, which can reduce the amount of time required to fix the errors.

Specifically, in one embodiment, the system receives a layout radius which specifies a region in the layout in proximity of the error's location. Next, the system identifies patterns in the layout within the layout radius. The system then determines a cell in the layout which contains the identified patterns.

Figure 5:
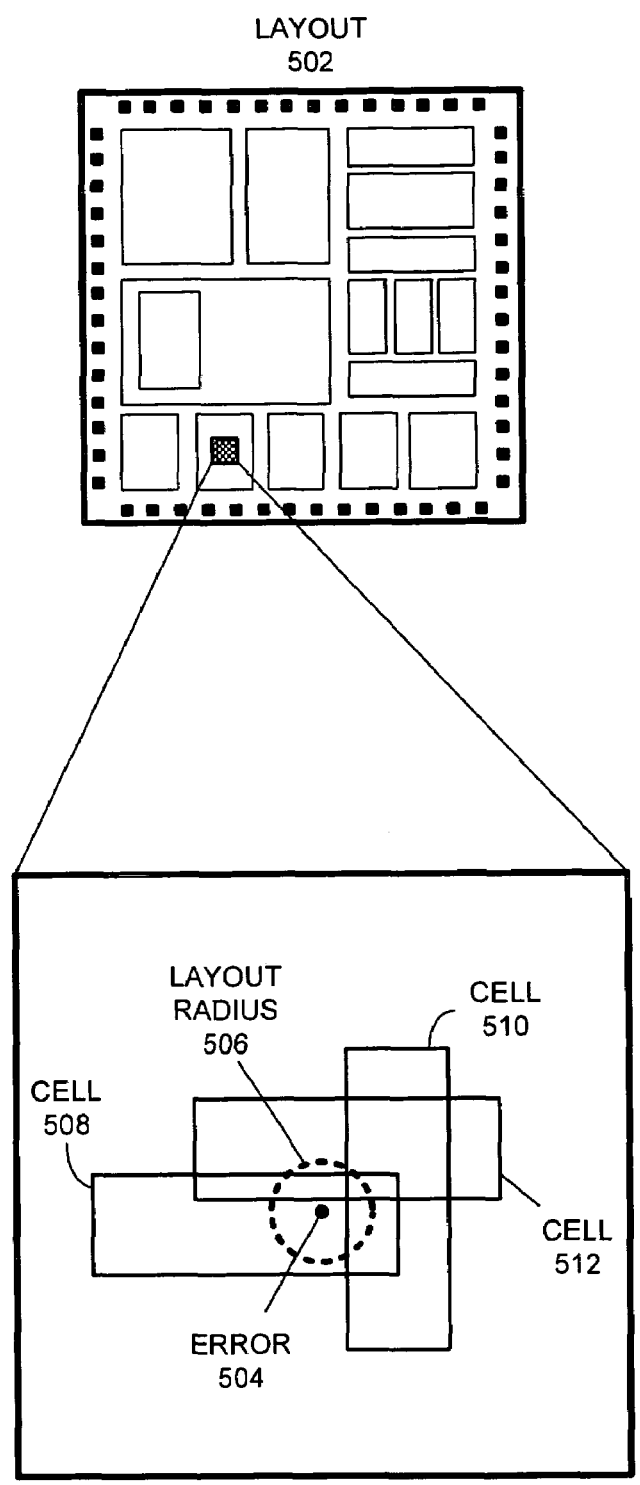
FIG. 5 illustrates how a layout radius can be used to associate an error with a cell in accordance with an embodiment of the present invention.

FIG. 5 illustrates how a layout radius can be used to associate an error with a cell in accordance with an embodiment of the present invention.

Layout 502 contains a number of cells which define patterns in the layout. Specifically, layout 502 contains cells 508, 510, and 512. (Note that, for the sake of clarity, only cell outlines have been illustrated; the actual patterns within the cells have not been illustrated.)

The system determines error 504 based a difference between an intended pattern (not shown) and the associated simulated pattern (not shown). The system then identifies patterns in the layout within layout radius 506. Note that the system can include patterns from other layers if it determines that they may have caused the error in question. (Note that although the layout radius is shown to be circular in shape, it will be apparent to one skilled in the art that the layout radius can refer to an arbitrary region in proximity of the error location.)

Next, the system identifies cells that contain the patterns within the layout radius. Specifically, the system identifies cells 508, 510, and 512 as those containing the patterns within the layout radius. Note that cells 508, 510, and 512 can contain patterns that belong to different layers of the layout.

Note that cells in a layout are typically organized in a hierarchical fashion. Furthermore, the cell hierarchy is often structured as a tree. In one embodiment, the system uses the cells within the layout radius to determine a lowest level cell that contains the identified patterns. In another embodiment, the system directly identifies a lowest level cell that contains patterns within the layout radius.

Figure 6:
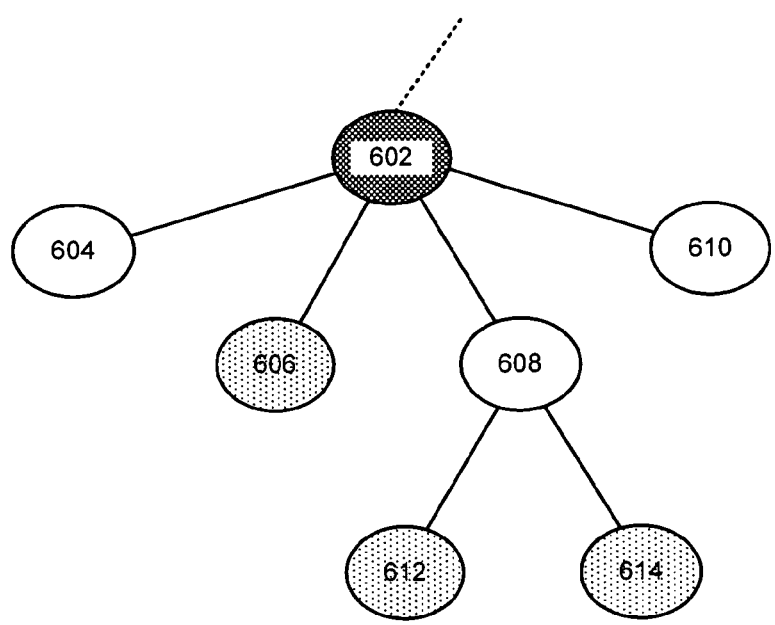
FIG. 6 illustrates a portion of a cell hierarchy in accordance with an embodiment of the present invention.

FIG. 6 illustrates a portion of a cell hierarchy in accordance with an embodiment of the present invention.

Cell 602 has four children, namely, cells 604, 606, 608, and 610. Cell 608, in turn, has two children: cells 612 and 614. Note that a layout can contain multiple instances of the same cell. For example, cells 604, 606, and 610 can be separate instances of the same cell.

The following discussion describes how the system can determine the lowest level cell that contains patterns within the layout radius. Let us assume that cells 508, 510, and 512 in FIG. 5 are the same as cells 606, 612, and 614 in FIG. 6, respectively. In this case, cell 602 is the lowest level cell that contains the patterns within layout radius 506 shown in FIG. 5. Specifically, cell 602 is the lowest common ancestor of cells 606, 612, and 614 in the cell hierarchy. Note that a number of techniques can be used to determine the lowest common ancestor in a cell hierarchy that has a tree structure.

Each cell is typically instantiated multiple times in the layout. Furthermore, a cell instance can be a mirror image or a rotated version of a cell. Hence, associating an error with a cell can be very advantageous because it allows the system to group errors which are associated with the same cell, even if the errors occur in patterns which are mirror images or rotated versions of the same cell layout.

In present lithography verification techniques, each error value is usually categorized as a distinct error. Unfortunately, this may prevent the system from grouping different instances of the same error under a single category, which may cause the system to report a large number of distinct errors. Note that reporting a large number of distinct errors is disadvantageous because it can overwhelm a design engineer.

To remedy this problem, one embodiment of the present invention receives an error radius which specifies a range of error values, wherein errors that have error values within the error radius are treated as instances of the same error.

Figure 7:
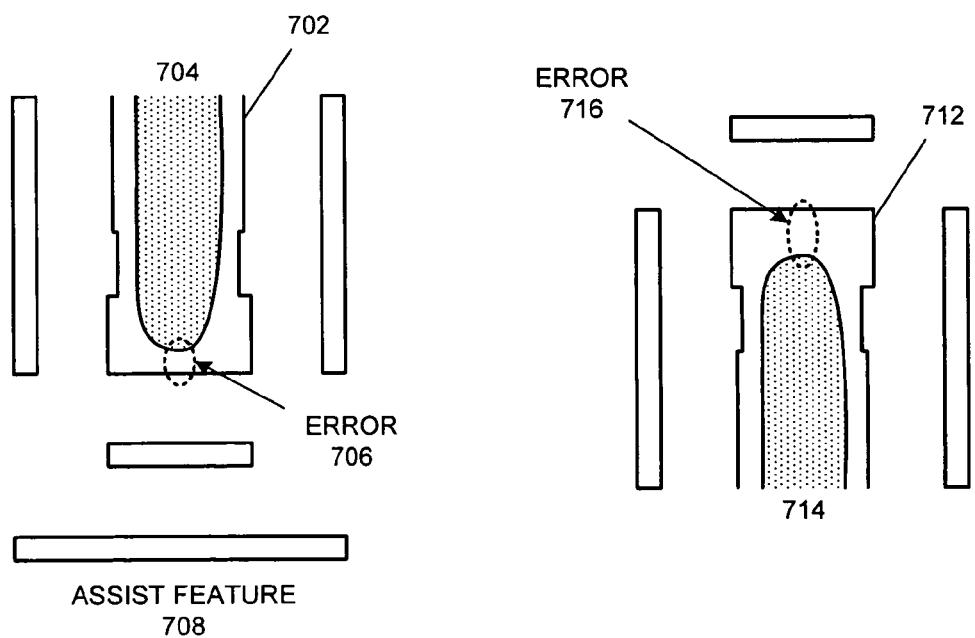
FIG. 7 illustrates how an error radius can be used to group different error values into the same error category in accordance with an embodiment of the present invention.

FIG. 7 illustrates how an error radius can be used to group different error values into the same error category in accordance with an embodiment of the present invention.

Patterns 702 and 712 are identical patterns, except that one is a rotated version of the other. Note that patterns 702 and 712 are intended to create desired features on the wafer's surface. Patterns 704 and 714 are simulated patterns that approximate the actual shapes of these features. Errors 706 and 716 represent the difference between the intended patterns and the simulated patterns. Note that error 706 is slightly less than error 716 because pattern 702 has an extra assist feature 708 around it.

Present lithography verification techniques are likely to classify errors 706 and 716 as distinct errors because of the following reasons. First, since present techniques do not associate errors with cells, they typically cannot account for pattern rotations or mirror images. Second, present techniques consider two errors to be distinct if the associated error values are different. Note that reporting errors 706 and 716 as distinct errors is disadvantageous because (a) it increases the number of errors reported, and (b) it misleads a designer into believing that these are two distinct errors, whereas the errors are in fact different instances of the same error.

In contrast, one embodiment of the present invention treats errors 706 and 716 as two instances of the same error. Specifically, the system can do this because (a) it uses an error radius to group slightly different error values into a single range of error values, and (b) it accounts for pattern rotations and mirror images.

In one embodiment of the present invention the system reports (or summarizes) layout errors to the user with the following information: associated cell name, error type, layer information, location of the error within the associated cell, error amount, error location in the layout, and the error radius.

CONCLUSION

The data structures and code described in the foregoing description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent to practitioners skilled in the art. Additionally, the above disclosure is not intended to limit the present invention. The scope of the present invention is defined by the appended claims.

What is claimed is:

1. A method for associating an error in a layout with a cell, the method comprising:
   receiving a layout which is designed to create a target feature;
   determining an error in a critical dimension of the target feature;
   identifying a cell in the layout based on the error's location in the layout, thereby associating the error with the cell; and
   outputting a set of errors associated with the cell;
   wherein associating errors with cells allows the errors to be summarized based on the associated cells, which can reduce the amount of time required to identify and fix the errors.

2. The method of claim 1, further comprising determining an error location within the cell based on the error's location in the layout.

3. The method of claim 1, wherein prior to receiving the layout, the method further comprises:
   receiving an uncorrected layout; and
   applying an optical proximity correction (OPC) to the uncorrected layout to create the layout.

4. The method of claim 1, wherein identifying the cell involves:
   receiving a layout radius which specifies a region in the layout in proximity of the error's location;
   identifying patterns in the layout within the layout radius; and
   determining a cell in the layout which contains the identified patterns.

5. The method of claim 1, further comprising receiving an error radius which specifies a range of error values, wherein errors that have error values within the error radius are treated as instances of the same error.

6. The method of claim 1, wherein determining an error in a critical dimension involves:
   generating a simulated shape based on the layout, wherein the simulated shape approximates the actual shape of the target feature by simulating effects of one or more semiconductor manufacturing processes; and
   determining an error in a critical dimension of the target feature based on a difference between the simulated shape and the intended shape of the target feature.

7. The method of claim 6,
   wherein the layout contains check-figures which identify critical dimensions of features which are likely to have errors;
   wherein generating simulated shapes only for those features that have an associated check-figure can substantially reduce the total amount of computational time spent on generating simulated shapes.

8. The method of claim 6, wherein a semiconductor manufacturing process can be:
   photolithography;
   etch; or
   chemical-mechanical polishing (CMP).

9. The method of claim 1, wherein determining the error can involve:
   determining an error location;
   computing an error value;
   determining an error type; and
   identifying layers in the layout that could have caused the error.

10. A computer-readable storage medium storing instructions that when executed by a computer cause the computer to perform a method for associating an error in a layout with a cell, the method comprising:
    receiving a layout which is designed to create a target feature;
    determining an error in a critical dimension of the target feature;
    identifying a cell in the layout based on the error's location in the layout, thereby associating the error with the cell; and
    outputting a set of errors associated with the cell;
    wherein associating errors with cells allows the errors to be summarized based on the associated cells, which can reduce the amount of time required to identify and fix the errors.

11. The computer-readable storage medium of claim 10, further comprising determining an error location within the cell based on the error's location in the layout.

12. The computer-readable storage medium of claim 10, wherein prior to receiving the layout, the method further comprises:
  receiving an uncorrected layout; and
  applying an optical proximity correction (OPC) to the uncorrected layout to create the layout.

13. The computer-readable storage medium of claim 10, wherein identifying the cell involves:
  receiving a layout radius which specifies a region in the layout in proximity of the error's location;
  identifying patterns in the layout within the layout radius; and
  determining a cell in the layout which contains the identified patterns.

14. The computer-readable storage medium of claim 10, further comprising receiving an error radius which specifies a range of error values, wherein errors that have error values within the error radius are treated as instances of the same error.

15. The computer-readable storage medium of claim 10, wherein determining an error in a critical dimension involves:
  generating a simulated shape based on the layout, wherein the simulated shape approximates the actual shape of the target feature by simulating effects of one or more semiconductor manufacturing processes; and
  determining an error in a critical dimension of the target feature based on a difference between the simulated shape and the intended shape of the target feature.

16. The computer-readable storage medium of claim 15, wherein the layout contains check-figures which identify critical dimensions of features which are likely to have errors;
  wherein generating simulated shapes only for those features that have an associated check-figure can substantially reduce the total amount of computational time spent on generating simulated shapes.

17. The computer-readable storage medium of claim 15, wherein a semiconductor manufacturing process can be:
  photolithography;
  etch; or
  chemical-mechanical polishing (CMP)

18. The computer readable storage medium of claim 10, wherein determining the error can involve;
  determining an error location
  computing an error value;
  determining an error type; and
  identifying layers in the layout that could have caused the error.

19. An apparatus for associating an error in a layout with a cell, the method comprising:
  a receiving mechanism configured to receive a layout which is designed to create a target feature;
  a determining mechanism configured to determine an error in a critical dimension of the target feature;
  an identifying mechanism configured to identify a cell in the layout based on the error's location in the layout, thereby associating the error with the cell; and
  an outputting mechanism configured to output a set of errors associated with the cell;
  wherein associating errors with cells allows the errors to be summarized based on the associated cells, which can reduce the amount of time required to identify and fix the errors.

20. The apparatus of claim 19, wherein the apparatus is further configured to determine an error location within the cell based on the error's location in the layout.

* * * * *